United States Patent [19]

Henneberg et al.

[11] Patent Number: 4,475,705
[45] Date of Patent: Oct. 9, 1984

[54] DOCUMENT HOLDER FOR DISPLAY TERMINAL

[75] Inventors: Helmut H. Henneberg, Canton; Richard R. Dillion, Wellesley, both of Mass.

[73] Assignee: Honeywell Information Systems Inc., Waltham, Mass.

[21] Appl. No.: 279,877

[22] Filed: Jul. 2, 1981

[51] Int. Cl.³ .............................................. A47B 97/04
[52] U.S. Cl. ................................ 248/447.2; 248/451; 248/231.8; 248/442.2
[58] Field of Search ............ 248/441 B, 441 C, 442.2, 248/443, 451, 205 R, 226.5, 302, 303

[56] References Cited

U.S. PATENT DOCUMENTS

| | | | |
|---|---|---|---|
| 632,037 | 8/1899 | Bauer | 248/441 C X |
| 1,635,900 | 7/1927 | Obiols | 248/451 |
| 1,798,809 | 3/1931 | Randall | 248/441 C X |
| 2,234,086 | 3/1941 | Rosebraugh | 248/443 |
| 2,514,068 | 7/1950 | Johnston | 248/443 |
| 2,604,724 | 7/1952 | Watts | 248/441 C X |
| 2,823,399 | 2/1958 | Stewart | 248/205 R X |
| 2,929,886 | 3/1960 | Marback | 248/303 X |
| 3,030,058 | 4/1962 | Rosing | 248/205 R |
| 3,762,632 | 10/1973 | Voegeli | 248/226.5 X |
| 4,313,112 | 1/1982 | Foster | 248/442.2 |

FOREIGN PATENT DOCUMENTS 523150  7/1940  United Kingdom ............ 248/441 C

OTHER PUBLICATIONS

P. 31, "Typing Aids" 1979 Honeywell Standard Catalog.
P. 57B, Honeywell Standard Catalog by Monroe.

*Primary Examiner*—William H. Schultz
*Attorney, Agent, or Firm*—William A. Linnell; Nicholas Prasinos

[57] ABSTRACT

A document holder attachable to a display terminal used to support one or more documents to be referenced by the display terminal user when information is entered or displayed on the display terminal screen is disclosed. The document holder is supported by an easel bracket which fits in an annular groove in the display terminal cover. The document easel is attached to the easel bracket such that an adjustment in the swivel or tilt of the display terminal for operator viewing convenience also results in a corresponding adjustment in the document holder such that the document holder always remains in the same relative viewing position with respect to the display terminal screen. The document holder can be easily added or removed from the display terminal and is reversible for either righthanded or lefthanded use.

7 Claims, 14 Drawing Figures

DOCUMENT HOLDER FOR DISPLAY TERMINAL

RELATED APPLICATIONS

U.S. patent application Ser. No. 279,876, now U.S. Pat. No. D279,876 entitled "Document Hold for Display Terminal", by Richard R. Dillon and Helmut H. Henneberg, contains related material and was filed on an even date with the instant U.S. patent application.

BACKGROUND OF THE INVENTION

1. Field of the Invention

The invention relates to a copy holder, more particularly to a document holder which is to be mounted on a display terminal, such as a cathode ray tube display, such that an adjustment of the viewing angle of the display terminal will result in the document holder remaining in the same relative position with respect to the display terminal screen.

2. Description of the Prior Art

The construction of document holders used to support a document which contains information which is to be entered by an operator through a data entry keyboard attached to a display terminal such as used in factories, offices or the like, is based on the recognition that the best possible efficiency of a display terminal operator is only achieved if the operator can suitable assume a comfortable and an anatomically correct position with respect to the document which he is entering or referencing while stationed at the display terminal. In a data processing environment this means placing the display terminal viewing area, such as the screen of a CRT display terminal, at a comfortable height, distance and angle from the terminal operator's eyes and also placing the document which is to be referenced or entered in an equally comfortable position. Also, such a correct viewing position contributes considerably to the operator remaining in health—reducing eye strain, posture fatigue, etc.

There exists in the marketplace many document holders, or copy holders, which range from the simple and inexpensive to the complex and costly. An example of a simple document holder is that constructed of a one piece of sheet metal bent into a shape similar to a leaning L when viewed from the side. In this document holder, the vertical surface is slightly reclining away from the user and is used to support the document being referenced. The bottom of the L is the base of the document holder and is used to support the document holder in a more or less vertical position. This document holder works fairly well for a secretary while seated at a typewriter because they can position it to the left or right side of the typewriter on the same surface on which the typewriter is supported. When used in this fashion, this holder provides for holding the document in approximately the same viewing position as the document being produced in the typewriter.

Figure 1:
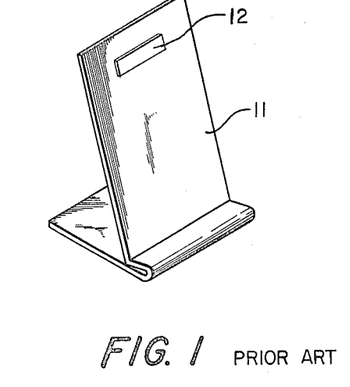
FIG. 1 is a perspective view of a prior art document holder.

There are many variations for this easel type of document holder. Some permit the adjustment of the easel surface so that it can be reclined, or tilted, toward or away from the operator. Other features have been added such as magnetic paper holders to retain the document to the easel surface and various line guides which may be moved in the vertical direction so that operators can keep track of their position on the document they are entering or referencing. An example of a simple easel document holder is shown in FIG. 1 in which element 11 is a sheet metal easel and element 12 is a magnetic page holder.

Figure 2:
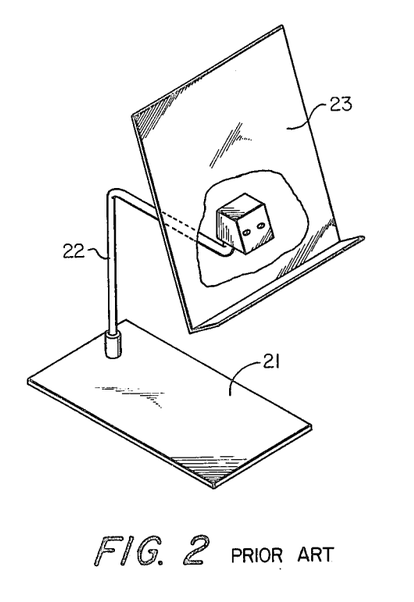
FIG. 2 is is perspective view of another prior art document holder.

With the introduction of computer terminals which have a height greater than most typewriters, the need to place the document holder at a greater height from the table than is possible by the simple document holders has been recognized. FIG. 2 shows such a prior art document holder in which the document easel 23 is supported by a supporting rod 22 which is in turn attached to a base 21 which rests on the table next to the display terminal. The document holder of FIG. 2 has the advantage that it may position the referenced document at approximately the same height as the terminal's display area, that is the print head of the display terminal, such that the operator of the terminal may reference quickly between the terminal output and the document on the document holder.

Other document holders exist which have a base that rests on the table which supports the terminal. Other document holders attach to an edge of the table and which support the document easel by one or two flexible shafts, such as found on gooseneck lamps, which can be bent to change the position of the document easel thereby allowing the document to be placed in a comfortable viewing position. Still others exist which have multi-member arms which are spring counterbalanced such that the height and position of the document easel can be adjusted over a wide range.

With the introduction of cathode ray tubes for use as a display device on terminals, various terminal manufacturers have recognized the need for being able to adjust the tilt and swivel of the display screen for viewing convenience. Such adjustment may be necessary to adjust the difference positions assumed by the operator during the course of operation, to adjust the viewing angle to minimize the reflection of ambient light off the display screen, or due to the face that the same display terminal is used by a variety of operators during the course of a single day's business.

Therefore, what is needed is an inexpensive document holder which can be easily adjusted for viewing angle as the viewing angle of the display terminal is adjusted.

OBJECTS OF THE INVENTION

Hence, it is the object of the present invention to design a document holder such that the viewing angle of the referenced document can be easily adjusted to be compatible with the viewing angle of the screen of the display terminal while the display operator is in the working position at the display terminal, be it seated or standing, thus making adjustments of the document holder especially simple and easy to operate.

It is another object of the present invention to provide a document holder which will automatically adjust the document holder for viewing convenience as the display terminal screen is adjusted for viewing convenience.

It is another object of the present invention to provide an inexpensive document holder.

It is another object of the present invention to provide a document holder that can be easily positioned to the right side or the left side of the display terminal thus allowing for operator preference and work space constraints.

It is yet another object of the present invention to provide a document holder that can be easily mounted and adjusted without requiring any tools and with minimum effort.

It is a still further object of the present invention to provide a document holder that can be broken down into individual components for shipment and assembled at the customer site easily and without requiring any tools.

SUMMARY OF THE INVENTION

Consequently, the present invention relates to a document holder which is attached to a display terminal cover. The document holder comprises an easel bracket which fits in an annular groove in the sides, top and bottom of the display terminal cover. The easel bracket when mounted on the display terminal cover has a support arm which projects horizontally to the side of the display terminal screen the end of which is formed at the right angles to the support arm to make a vertically projecting mounting pin. The document easel is attached to the easel bracket by placing the mounting pin in a hole in a mounting block secured to the back of the document easel. A bottom ledge and lip is formed on the bottom of the document easel to support the document and a document retainer holds the document to the easel surface. By supporting the document easel off of the display terminal, any adjustment in swivel or tilt of the display terminal screen for operator viewing convenience also results in a corresponding adjustment of both swivel and tilt in the document holder such that the document holder always remains in the same relative viewing position with respect to the display terminal screen. The document holder can be easily removed from the display terminal and is reversible such that it may be placed on either the righthand or the lefthand side of the display terminal screen. The document holder may also be rotated on the mounting pin thereby allowing it to be adjusted so that it is at a slight angle with respect to the display terminal screen so that the operator can adjust it for additional viewing convenience.

BRIEF DESCRIPTION OF THE DRAWINGS

The manner in which the apparatus of the present invention is constructed and its mode of operator can best be understood in light of the following detailed description together with the accompanying drawings in which like reference numbers identify like elements in the several figures and in which.

DESCRIPTION OF THE PREFERRED EMBODIMENT

Figure 3:
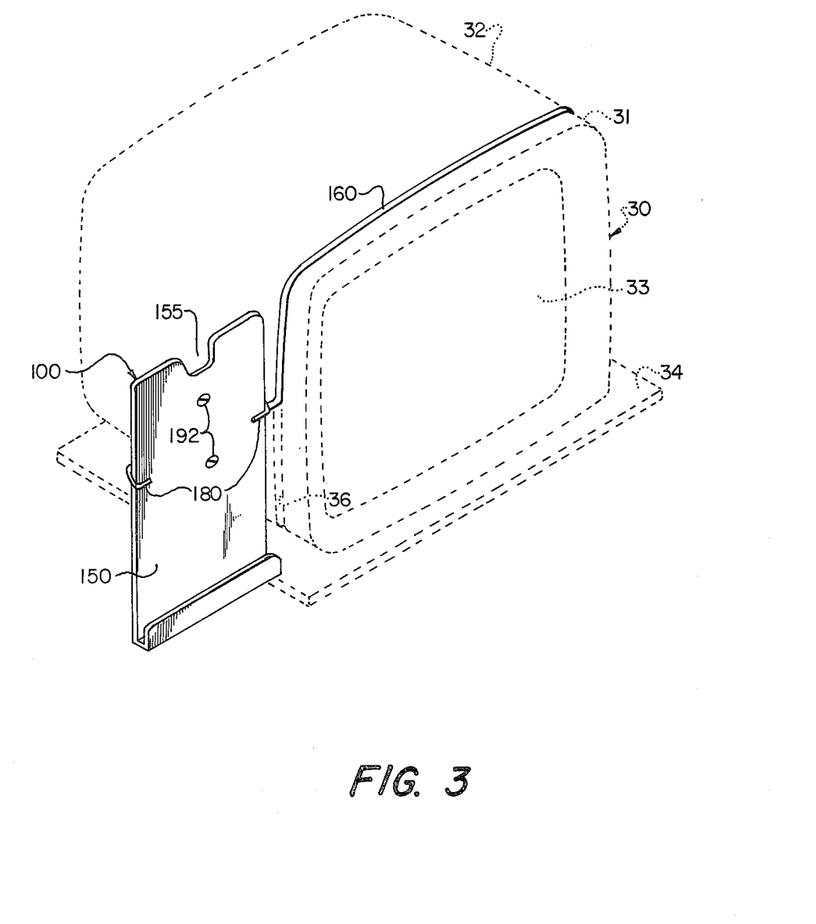
FIG. 3 is a perspective view of a document holder of the present invention.

FIG. 3 shows a perspective view of document holder 100 attached to the lefthand side of display terminal 30. Document holder 100 is comprised of document easel 150, easel bracket 160, mounting block 170, sheet retainer 180, thumb screw 191 (not visible in FIG. 3), and two flat head screws 192. Document holder 100 is attached to display terminal 30 by mounting easel bracket 160 into an annular groove 36 formed in the display housing between display cover 32 and bezel 31. Annular groove 36 is preferably formed in the display housing slightly behind the plane of screen 33 such that when document easel 150 is mounted on display bracket 160 the easel surface 151 will fall in the same plane as screen 33; this places the document which is being held by the document holder 100 equal distance from the operator as is screen 33 and eliminates the need for the operator to refocus his eyes when referencing back and forth between the referenced document and screen 33.

Figure 4A:
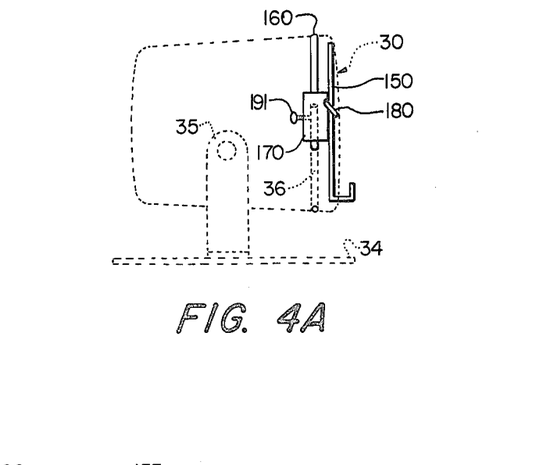
FIG. 4A is a left side elevation view of the present invention mounted on a display terminal.
Figure 4B:
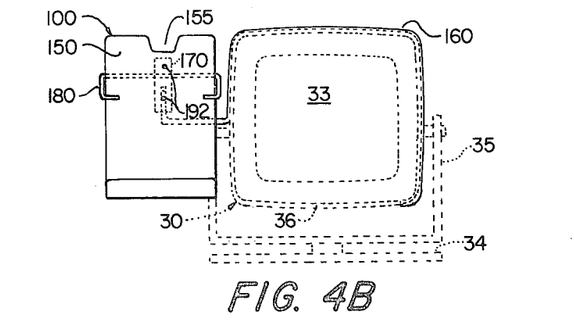
FIG. 4B is a front elevation view of the present invention mounted on a display terminal.
Figure 4C:
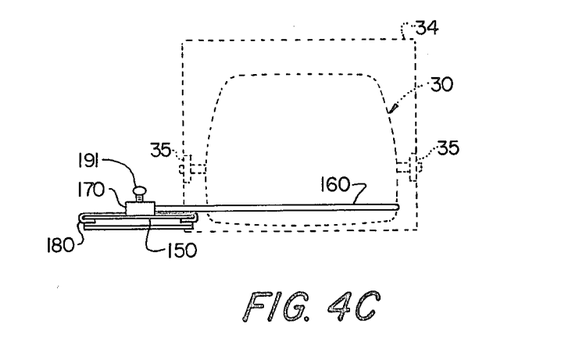
FIG 4C is a top elevation view of the present invention mounted on a display terminal.
Figure 5A:
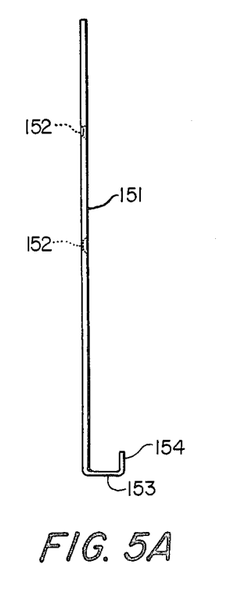
FIG. 5A is a left side elevation view of the document easel of the present invention.
Figure 5B:
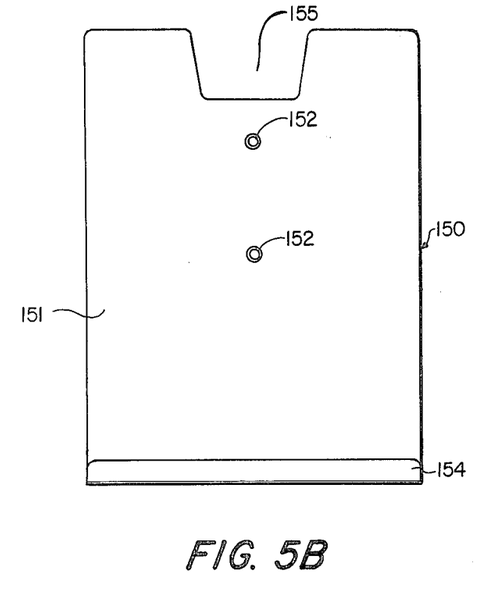
FIG. 5B is a front elevation view of the document easel of the present invention.

The advantage of having the document holder mounted directly on the display terminal becomes more apparent when the display terminal is the kind that permits viewing angle adjustment by swivel of the display screen about a vertical axis or tilt up or down of the screen about a horizontal axis running from side to side on the display terminal. In FIG. 3 and in FIGS. 4A, 4B and 4C, the ability to rotate, or swivel, the display screen from side to side about the vertical axis and to tilt the screen up or down about a horizontal axis is provided by mounting the display terminal 30 on a base 34 via a mounting yoke 35 (not visible in FIG. 3). Mounting yoke 35 is rotatably fixed to base 34 such that the terminal may be swiveled from side to side about a vertical axis running through the center of the horizontal member of mounting yoke 35 and base 34. Such rotation might be required when the operator changes his position relative to the display terminal. The tilting of screen 33 is provided by rotatably mounting the display terminal 30 in relation to mounting yoke 35 such that the display screen may be tilted up or down about a horizontal axis through pivot points on the upper end of mounting yoke 35. Such tilting may be required for different height operators or the changing of an operator from the seating to the standing position or vice versa. The swivel and tilt of the screen operations may also be desired even during the course of a day as the same operator operates a terminal in different ambient light conditions in order to reduce glare from ambient light reflected off of screen 33. FIGS. 5A and 5B are left side and front views respectively of document easel 150. Document easel 150 is formed to have easel surface 151, bottom ledge 153, lip 154, and finger cutout 155. The back of the document being referenced rests against easel surface 151 and the bottom edge of the reference document is supported by bottom ledge 153. Lip 154 prevents the bottom edge of the referenced document from falling off bottom ledge 153. This function of lip 154 becomes more important if the top edge of easel surface 151 is inclined toward the viewer and the bottom edge inclined away from the viewer such as that the referenced document is being held by lip 154 and sheet retainer 180 and the bottom edge being supported by bottom ledge 153. The length and width of easel surface 151 are chosen to accommodate the size of the referenced document to be held and the depth of bottom ledge 153 is determined by the maximum thickness of the referenced document. Finger cutout 155 is provided at the top of document easel 150 so that the terminal operator can easily grasp the top of the referenced document which projects above the bottom of finger cutout 155. In the preferred embodiment, easel surface 151 is 8.75 inches wide, 13.0 inches high, bottom ledge 153 is 0.75 inches deep, and lip 154 is 0.5 inches high. In the preferred embodiment, finger cutout 155 is centered on the top of document easel 150 and is 2.75 inches wide at the top, 2.0 inches wide at the bottom, and the bottom is 3.0 inches from the top of document easel 150.

Two screw holes 152 are provided along the vertical center line of easel surface 151 so that flat head screws can be used to attach the document easel 150 to mounting block 170. In the preferred embodiment, document easel 150 is formed by bending a sheet of 0.9 inch thickness aluminum to the desired shape. Other materials having sufficient rigidity could also be used, such as sheet steel, which would have the additional property that magnetic paper holders and line finders could be used. As an alternative, document easel 150 could be made of a clear transparent plastic and thereby allow the terminal operator to see through the document easel when there was no referenced document in place on the document easel.

Figure 6A:
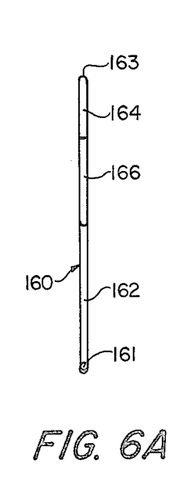
FIG. 6A is a left side elevation view of the easel bracket of the present invention.
Figure 6B:
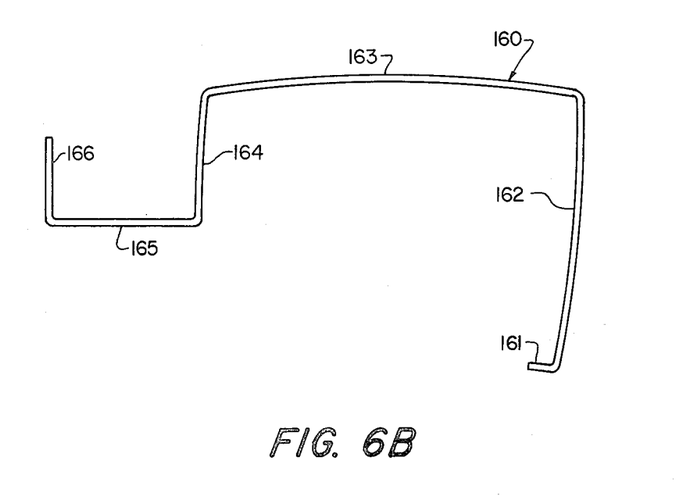
FIG. 6B is a front elevation view of the easel bracket of the present invention.

FIGS. 6A and 6B show left side and front views of easel bracket 160. In the preferred embodiment, easel bracket 160 is formed by bending a cold rolled steel rod, having a diameter of 0.218 inches and a satin-chrome finish, into the shape shown in FIG. 6B. The length and the shape of the top member 163 is determined by the width and shape of the annular groove formed in the top of the display housing between the display cover 32 and bezel 31. Similarly, the length and shape of full side member 162 is determined by the height and shape of the annular groove in the side of the display housing. The length and shape of half side member 164 is also determined by the shape of the annular groove in the side of the display housing and the length is determined to be approximately half the height of the display housing. In the preferred embodiment in which easel bracket 160 is formed from a 0.218 inch diameter rod, the annular groove is 0.225 inches wide and deep so that the easel bracket 160 can be easily mounted and removed and so that, when mounted, the top of easel bracket 160 is flush with the top of display cover 32.

By making the length of half side member 164 half that of the height of the display cover 32, support arm 165 will project to the side of the display terminal half way down screen 33. Support arm 165 is formed such that when easel bracket 160 is mounted on the display terminal 30, it will project horizontally to the side of the display terminal. The length of support arm 165 is such that it is a little greater than half the width of the document easel 150, thereby providing that the document easel will clear the side of display terminal 30. For example, in the preferred embodiment where document easel 150 is 8.75 inches wide, the length of support arm 155 is five inches. Mounting pin 166 is formed at right angles to support arm 165 and is a sufficient length such as the document easel does not wobble when placed on easel bracket 160. In the preferred embodiment, mounting pin 166 is three inches in length.

Return 161 is formed at the lower end of full side member 162 so that it can grip one of the lower corners of the display cover 32. The purpose of return 161 is to prevent the easel bracket 160 from tending to pop off the display terminal when downward pressure is applied to mounting pin 166, which can occur which a downward force is applied to the document easel 150. The length of return 161 need only be sufficient to grip the corner of the display cover 32 and if made too long will interfere with the mounting of easel bracket 160 on the display terminal. In the preferred embodiment the length of return 161 is one inch. This length has been found to be sufficient for an easel bracket used on a display terminal housing a twelve inch diagonally measured CRT screen. Easel bracket 160 is formed so that the angle between top member 163 and full side member 162 is slightly less than the angle between the top and sides of the display cover 32 such that the spring provided by opening up the angle to that of the display cover causes the easel bracket 160 to grip the display cover 32 and assures that return 161 will catch the lower corner of display cover 32.

Figure 7A:
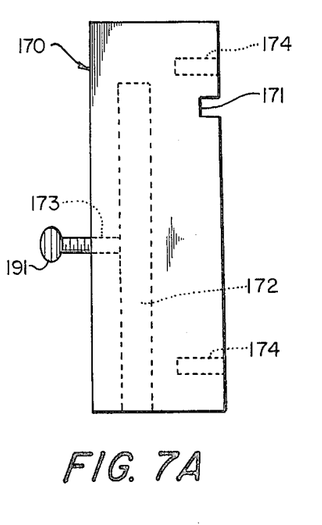
FIG. 7A is a left side elevation view of the mounting block of the present invention.
Figure 7B:
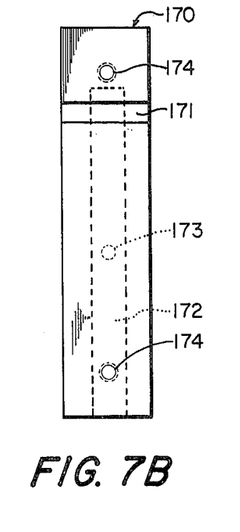
FIG. 7B is a front elevation view of the mounting block of the present invention.

Referring now to FIGS. 7A and 7B which show left side and front views of mounting block 170. Mounting block 170 is attached to the back of document easel 150 by two flathead screws 192 which enter mounting screw holes 174. Retainer notch 171 is formed across the face of mounting block 170 to receive sheet retainer 180. When assembled, back member 183 of sheet retainer 180 fits in retainer notch 171 and is captured there by the back of document easel 150. The depth and width of retainer notch 171 is such that it will snugly accommodate the diameter of the wire used for sheet retainer 180 thereby assuring that sheet retainer 180 will remain in the position in which it is left by the terminal operator after placing the reference document on document easel 150. Mounting hole 172 is provided in mounting block 170 to accommodate mounting pin 166. Mounting hole 172 is provided at a sufficient distance from the face of mounting block 170 so that the document easel 150 may be rotated for terminal operator viewing convenience upon mounting pin 166 approximately 15 degrees before the back of document easel 150 hits support arm 165. Thumb screw hole 173 is provided on the back of mounting block 170 to accommodate thumb screw 191 which can be tightened so that its end engages mounting pin 166 and fixes document easel 150 in its adjusted position at a convenience viewing angle with respect to the screen 33.

In the preferred embodiment, mounting block 170 is a plastic block, 0.75 inches wide, 1.28 inches deep, and 3.25 inches high. In the preferred embodiment, mounting hole 172 is 0.218 inches in diameter, 2.75 inches in depth from the bottom of the mounting block with its center line 0.9 inches from the face of mounting block 170. In the preferred embodiment, mounting block 170 is mounted on document easel 150 such that the bottom of mounting block 170 is 5.25 inches from the bottom of document easel 150 thus providing that the center line of an 11 inch high document will fall approximately on the horizontal center line of screen 33.

If the annular groove around the display terminal 30 is not in the same plane as screen 33, as may be the case when the top of bezel 31 extends forward to provide a shade for screen 33, the side of mounting block 170 can be tapered by an angle equal to the differences in the annular groove and screen planes. The tapering of the mounting block will result in easel surface 150 being at an angle with respect to mounting pin 166 which will result in easel surface 150 being in the same plane as screen 33. This tapering is preferred to the bending of mounting pin 166 to be in the plane as screen 33 because such bending would make mounting bracket 160 nonreversible.

Figure 8A:
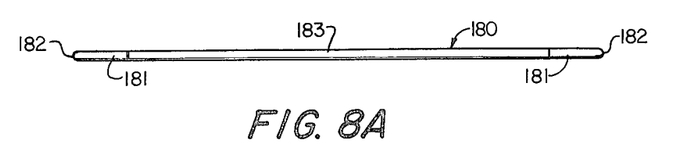
FIG. 8A is a front elevation view of the sheet retainer of the present invention.
Figure 8B:
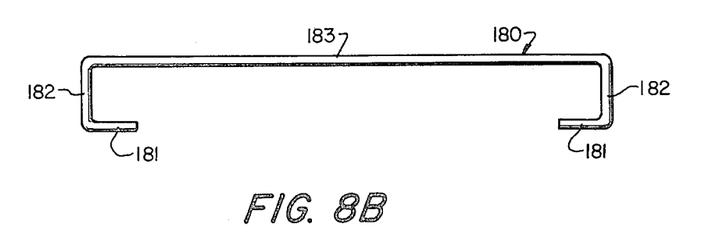
FIG. 8B is a top elevation view of the sheet retainer of the present invention.

Turning now to FIGS. 8A and 8B, which are a front and top view of sheet retainer 180. Sheet retainer 180 is formed as is shown most clearly in FIG. 8B such that it has returns 181, side members 182 and back member 183. The length of back member 183 is of sufficient length so that the side members 182 will clear the sides of the document easel 150. Returns 181 are of sufficient length to hold the edges of the reference document and thereby grip the reference document to easel surface 151. However returns 181 are sufficiently short so that they will fall within the margins of most reference documents and will not interfere with the reading of text.

In a preferred embodiment in which document easel 150 is 8.75 inches wide, back member 183 is 8.87 inches long, side members 182 are 0.88 inches long, and returns 181 are 0.75 inches long. Also in a preferred embodiment, sheet retainer 180 is formed using 0.125 stainless steel rod. Sheet retainer 180 has the advantage over a magnetic copyholder in that it will work with document easels made of non-magnetic materials such as aluminum or plastic. Further, it will not normally obscure any of the text on the document being held in the document holder. However, in order for sheet retainer 180 to function, the document must be wider than the distance between the ends of returns 181 and longer than the distance between bottom ledge 153 and returns 181.

The easel assembly is assembled at the factory by placing sheet retainer 180 into retainer notch 171 and then slipping the document easel 150 between returns 181 and back member 183 before attaching the document easel 150 to mounting block 170 by screws 192. As an alternative to using screws 192, it is envisioned that mounting block 170 can be attached to document easel 150 by the use of adhesives or welding depending upon the material used. Once the easel assembly is assembled, the document holder may be shipped to the customer in two parts consisting of the easel assembly and the easel bracket 160. The document holder is then placed on the display terminal by the customer slipping easel bracket 160 into the annular groove between display cover 32 and bezel 31 with the support arm 165 projecting to either the righthand or lefthand side of the display terminal depending upon operator preference and space constraints. The easel assembly is then mounted on easel bracket 160 by placing the mounting block 170 over mounting pin 166 and inserting pin 166 into mounting hole 172. The terminal operator can then adjust the swivel of the document easel 150 with respect to the support arm 165 and screen 33 and, once adjusted, tightens thumb screw 191 to fix it in the preferred viewing position. It being noted that this final assembly at the customer's site requires no special tools or skills. It being further noted that the document holder may be easily removed and, if desired, can be replaced on the other side of the display terminal thus providing for the easy placement of the document easel 150 on either the left or right side of screen 33.

While the invention has been shown or described with reference to the preferred embodiment thereof, it will be appreciated by those skilled in the art that the above and other changes may be made therein without departing from the spirit and scope of the invention.

What is claimed is:

1. A document holder for attachment to a display terminal, said display terminal having a display screen and a cover, said cover having a plurality of sides, a bottom and a top, said cover having an annular groove in said plurality of sides, said bottom and said top, said annular groove located approximately in the same plane as said display screen, said document holder comprising:
   A. an easel bracket for mounting in said annular groove in said cover of said display terminal; and
   B. document easel assembly mounted on said easel bracket whereby adjusting the viewing angle of said display terminal by swiveling or tilting said display terminal automatically adjusts the viewing angle of said document holder and wherein said document easel assembly further comprises:
      1. a document easel having an easel surface with a bottom ledge at the bottom of a front of said easel surface; and
      2. a mounting block attached to a back of said easel surface, said mounting block having a circular mounting hole for attaching said easel assembly to said easel bracket thereby allowing for the assembly of said document easel assembly to said easel bracket without requiring any tools, said circular mounting hole being of sufficient size to accommodate a mounting pin having a circular cross-section, said mounting pin being formed at one end of said easel bracket; and
   C. a sheet retainer formed to have a back member and two side members, a one of said side members at each end of said back member, each of said two side members having a return at an end not connected to said back member and wherein said mounting block further includes a retainer notch for retaining said sheet retainer between said mounting block and said back of said easel surface.

2. The document holder of claim 1 where said document easel further includes a lip at a front edge of said bottom ledge.

3. The document holder of claim 1 wherein said easel bracket is reversible so that it can be mounted on either the lefthand or righthand side of said display terminal without requiring any tools.

4. The document holder of claim 1 wherein said easel bracket is a metal rod.

5. The document holder of claim 1 wherein said document easel is formed from sheet metal and said mounting block is made of plastic.

6. The document holder of claim 1 wherein said sheet retainer is formed form a metal rod having a circular cross-section.

7. The document holder of claim 1 wherein said document easel includes a finger cutout at a top edge for allowing the easy grasping of a reference document.

* * * * *

UNITED STATES PATENT AND TRADEMARK OFFICE
CERTIFICATE OF CORRECTION

PATENT NO. : 4,475,705

DATED : October 9, 1984

INVENTOR(S) : Helmut H. Henneberg and Richard R. Dillon

It is certified that error appears in the above-identified patent and that said Letters Patent are hereby corrected as shown below:

Title page item [75]:

The last name of the second inventor should be changed from "Dillion" to --Dillon--.

Signed and Sealed this

Twenty-eighth Day of May 1985

[SEAL]

Attest:

DONALD J. QUIGG

Attesting Officer     Acting Commissioner of Patents and Trademarks